US012617127B2

(12) United States Patent
Stolzenberg et al.

(10) Patent No.: US 12,617,127 B2
(45) Date of Patent: May 5, 2026

(54) PLASTIC RECYCLING METHOD FOR PROCESSING PLASTIC WASTE

(71) Applicant: GRANNEX GMBH & CO. KG, Osnabrück (DE)

(72) Inventors: Andreas Stolzenberg, Schwanewede (DE); Markus Börger, Osnabrück (DE)

(73) Assignee: GRANNEX GmbH & Co. KG, Osnabrück (DE)

( * ) Notice: Subject to any disclaimer, the term of this patent is extended or adjusted under 35 U.S.C. 154(b) by 441 days.

(21) Appl. No.: 18/029,402

(22) PCT Filed: Apr. 29, 2022

(86) PCT No.: PCT/DE2022/100325
§ 371 (c)(1),
(2) Date: Mar. 30, 2023

(87) PCT Pub. No.: WO2023/208260
PCT Pub. Date: Nov. 2, 2023

(65) Prior Publication Data
US 2025/0073959 A1      Mar. 6, 2025

(51) Int. Cl.
B29B 17/02 (2006.01)
B29B 17/04 (2006.01)
B29B 17/00 (2006.01)

(52) U.S. Cl.
CPC .......... B29B 17/02 (2013.01); B29B 17/0412 (2013.01); *B29B 2017/0015* (2013.01);
(Continued)

(58) Field of Classification Search
CPC ............... B29B 17/02; B29B 17/0412; B29B 2017/0015; B29B 2017/0203;
(Continued)

(56) References Cited

U.S. PATENT DOCUMENTS

| | | |
|---|---|---|
| 5,257,740 A | 11/1993 | Prew et al. |
| 5,351,895 A | 10/1994 | Brooks et al. |

(Continued)

FOREIGN PATENT DOCUMENTS

| | | |
|---|---|---|
| CN | 103476515 A | 12/2013 |
| DE | 102013213478 A1 | 1/2015 |

(Continued)

OTHER PUBLICATIONS

Anonymous: "Abwasser-Aufbereitung im Kunststoff-Recycling—Krones" or "Wastewater treatment in plastic recycling—Krones", May 31, 2021 (May 31, 2021), Seiten 1-5, XP055983032, Gefunden im Internet: URL: https://www.krones.com/de/unternehmen/presse/abwasser-aufbereitung-im-kunststoff-recycling.php [gefunden am Nov. 18, 2022] das ganze Dokument.
(Continued)

*Primary Examiner* — Michael Mccullough
*Assistant Examiner* — Jessica J Burkman
(74) *Attorney, Agent, or Firm* — Harness, Dickey & Pierce, P.L.C.

(57) ABSTRACT

A plastic recycling method for processing plastic waste, including providing a plastic waste mixture stream having, on the one hand, a variable proportion of 2D material and a variable proportion of 3D material and, on the other hand, an inhomogeneous density distribution, the proportions varying over time. Washing both proportions of the plastic waste mixture stream together. Shredding both proportions of the plastic waste mixture stream together while supplying a cleaning fluid. Density-based separation of the plastic waste mixture stream into at least two fractions, wherein the separation is performed as a function of a predeterminable density separation cut; and for at least one of the separated fractions: separating the fraction of 2D material and the fraction of 3D material from each other.

23 Claims, 3 Drawing Sheets

(52) U.S. Cl.
CPC ................. *B29B 2017/0203* (2013.01); *B29B 2017/0241* (2013.01); *B29B 2017/0272* (2013.01); *B29B 2017/0484* (2013.01)

(58) Field of Classification Search
CPC .... B29B 2017/0234; B29B 2017/0237; B29B 2017/0241; B29B 2017/0272; B29B 2017/0484
See application file for complete search history.

(56) References Cited

U.S. PATENT DOCUMENTS

| | | | | |
|---|---|---|---|---|
| 9,056,403 | B2 * | 6/2015 | De Feraudy | ............ B02C 23/10 |
| 9,469,049 | B2 | 10/2016 | Lindner | |
| 2002/0033550 | A1 * | 3/2002 | Suehara | .................. B29B 17/02 |
| | | | | 264/921 |

| | | | | |
|---|---|---|---|---|
| 2008/0257794 | A1 | 10/2008 | Valerio | |
| 2021/0323198 | A1 * | 10/2021 | Lupisan | .............. B29B 17/0026 |
| 2023/0294107 | A1 * | 9/2023 | Reeves | ................... B29B 17/02 |
| | | | | 241/24.28 |

FOREIGN PATENT DOCUMENTS

| | | | |
|---|---|---|---|
| EP | | 0557816 A2 | 9/1993 |
| WO | WO-2009061556 | A1 | 5/2009 |
| WO | 2012/071060 | A2 | 5/2012 |

OTHER PUBLICATIONS

International Search Report (German) and Written Opinion of the ISA (German) issued in PCT/DE2022/100325, mailed on Nov. 29, 2022; ISA/EP.

* cited by examiner

Figure 1:
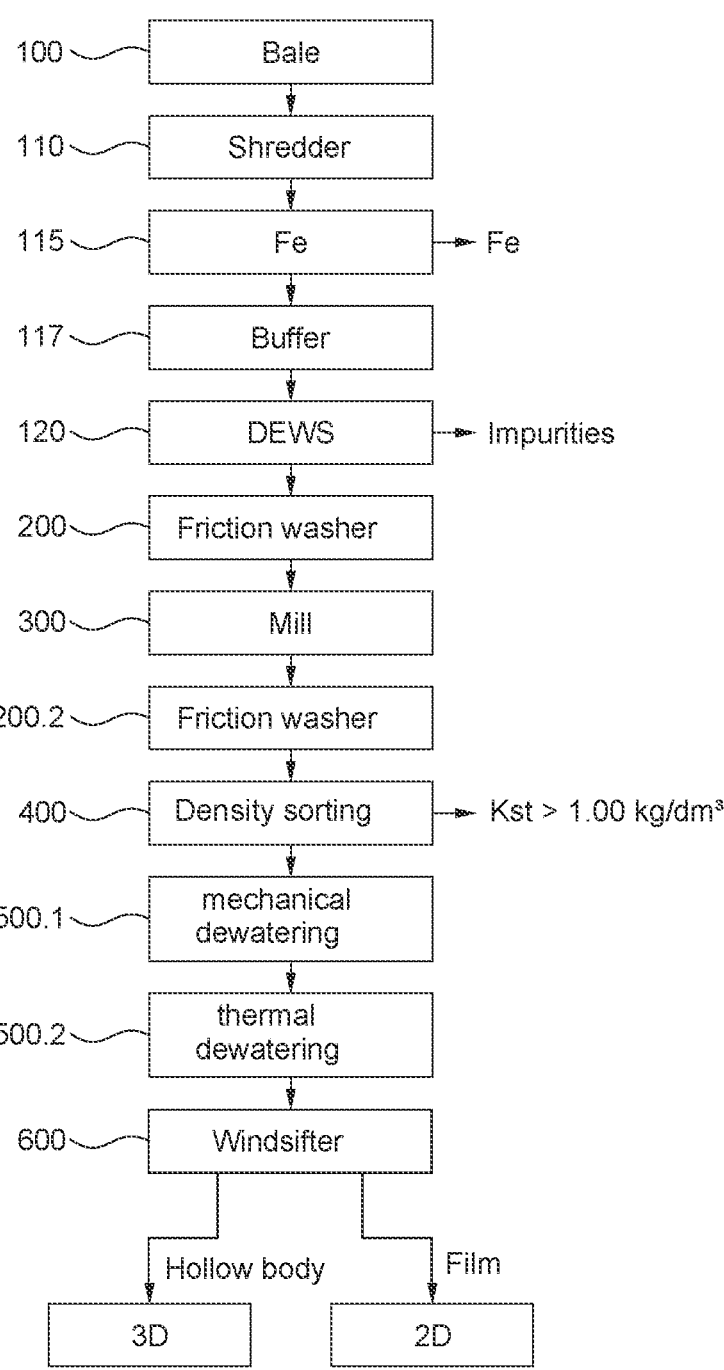

<u>Fig. 1</u>

PLASTIC RECYCLING METHOD FOR PROCESSING PLASTIC WASTE

CROSS-REFERENCE TO RELATED APPLICATIONS

This application is a U.S. National Phase Application under 35 U.S.C. 371 of International Application No. PCT/DE2022/100325, filed on Apr. 29, 2022. The entire disclosure of the above application is incorporated herein by reference.

BACKGROUND

This section provides background information related to the present disclosure which is not necessarily prior art.

Technical Field

The invention is based on a plastic recycling method for processing plastic waste, which essentially comprises the steps of washing, shredding, and separating a plastic stream.

Discussion

Rising volumes of plastic waste pose huge challenges for our society in the coming years. In 2019, around 5.35 million tons of post-consumer plastic waste was generated in Germany. Of this, only 1.33 million tons was sent for material recycling in processing plants within Germany. From this, in turn, only 1.03 million tons of output was ultimately generated in a quality suitable for reuse in the plastics processing industry. This corresponds to a quota of just over 19%. The truth about Germany's performance in plastics recycling and the use of recyclates is correspondingly sobering.

As of today, Germany does not have the necessary recycling infrastructure to economically and technically process the quantities of plastic waste generated here into high-quality recyclates. Many processing plants today are not state of the art, are outdated and have very weak economic foundations.

Increasing plastic waste volumes, stricter national and international legislation on approval procedures and on increasing recycling rates and the use of recyclates, as well as waste import & export restrictions, pose huge challenges for EU member states and especially plastics recyclers in the coming years. Investments in reprocessing capacities and especially the development of new reprocessing processes to solve the described challenges and problems are urgently needed.

One of the biggest challenges for plastics recyclers are highly contaminated plastic waste mixtures. With existing recycling processes & plants, these fractions can currently only be recycled to a very limited extent. Therefore, a large part of this waste currently finds its way into thermal recycling. In addition, a large proportion of the recyclates produced do not allow stable plastics processing due to qualitative deficits and therefore rarely replace virgin material in technically sophisticated plastic products on a sustainable basis.

Today's situation calls for new approaches to processing and the creation of additional capacities in order to meet the requirements of the Packaging Act and KrWG, among others, which are already in force today, to sustainably increase material quotas and to provide the plastics processing industry with sufficient quantities of plastic recyclates of a particularly high and consistent quality as a substitute for primary plastics in the future.

The development of economically viable concepts for the mechanical processing of heavily contaminated and mixed plastic waste volumes, which have so far been predominantly thermally recycled, is critical. New and modern processing technology holds great potential to meet recycling quotas and, among other things, to avoid levies on plastic waste mixtures that have not yet been recycled in Germany and to reduce a further economic and ecological burden caused by plastic waste volumes that are not recycled.

Often, mixed plastics are collected but are only sent for recycling after passing through complex dry-mechanical separation steps such as ballistic separators or NIR sorters. However, because films, bags and trays can only be poorly cleaned and separated from other types of plastics in these existing processes and plants, large parts of them are not sent for reprocessing but are lost for recycling. These sorting residues that are not recycled are therefore recovered for energy and the thermal energy they contain is used to provide electricity and district heating.

A process for the separation and recovery of plastics is known from DE 10 2013 213 478 A1. In this process, the desired types of plastic are separated from a resulting plastic mixture at the beginning of the process, followed by cleaning and drying, size separation, color sorting, separation of the desired types of plastic by grade, color sorting of the plastic batches, and granulation and production of regranulates. The disclosed process has the disadvantage that a pre-separation of certain types of plastics is already carried out at the beginning, and thus only a low recycling quota can be achieved, since the separated plastics are for the most part not recycled but sent for thermal utilization.

SUMMARY

This section provides a general summary of the disclosure, and is not a comprehensive disclosure of its full scope or all of its features.

It is therefore one aspect of the present invention to improve a plastics recycling process for the treatment of plastics waste in such a way that a higher recyclable material yield and a significantly increased grade purity can be achieved with the recyclates produced from plastic waste mixtures. Furthermore, it is the task of the invention to economically process a wide variety of material streams provided by the market, to increase the recycling rate and the supply of high-quality recyclates, especially from material streams that have been difficult to recycle up to now, and to meet the demand for processing capacities on a decentralized and regional basis.

Accordingly, it is provided a plastic recycling method for the treatment of plastic waste, comprising the following steps: Providing a plastic waste mixture stream having, on the one hand, a variable proportion of 2D material and a variable proportion of 3D material and, on the other hand, an inhomogeneous and variable density distribution, the proportions varying over time; Washing both proportions, 2D and 3D, of the plastic waste mixture stream together; Shredding the plastic waste mixture stream while supplying a cleaning fluid; Density-based separating the plastic waste mixture stream into at least two fractions, wherein the separation is performed in response to a predeterminable density separation cut; In at least one of the separated fractions: Separating the fraction of 2D material and the fraction of 3D material from each other. Providing a plastic waste mixture stream with variable proportions of 2D material and 3D material may imply that the supplied plastic waste mixture stream is significantly more heterogeneous compared to conventional processes and, in particular, may also be subject to large fluctuations with respect to the individual proportions when viewed over time. The plastic waste mixture can be provided as bales. The compressed plastic bales can be placed on a charging belt by means of a forklift, the binding wires removed and conveyed into the hopper of a crusher or shredder, whereby the wires can optionally also be left on the bale. It may be envisaged that the washing of the plastic waste mixture stream is carried out using water only. Compared to conventional processes, the washing of the plastic waste mixture stream can be carried out as a whole, so that the 2D material or films and the 3D material or hard plastics are prewashed together. In contrast, it is known from conventional processes that these two fractions are washed separately.

The process according to the invention thus has the advantage that it can process a plastic waste mixture stream with fluctuating 2D/3D proportions in the input. The joint processing of 2D and 3D materials thereby leads to a significantly higher yield of all valuable material components for material recycling compared to the processes known from the prior art. In addition, HDPE (high-density polyethylene) regrind, PP (polypropylene) regrind and PO (polyolefin) film regrind can be recovered in the same process or in a single plant carrying out the process. Furthermore, in a multi-stage implementation of the process, different polymer or thermoplastic grades can be recovered separately from one another.

As a rule, 3D/2D separation in LVP sorting plants takes place before shredding. In contrast, the present invention has the advantage that by shifting this process stage after the disintegration, enrichment and washing process step, only films/2D can be separated from hollow ground material/3D. It is not a problem for the process if fluctuations in the ratio of 2D to 3D occur in the plastics mixture stream.

It may be provided that the proportion of 2D material and/or the proportion of 3D material in the plastic waste mixture stream is also detected and a feed parameter of the plastic waste mixture stream is regulated as a function of the detected proportion of 2D and/or 3D material. The detection of the proportion can be done, for example, optically and/or by weight measurement. The adjustable feed parameters may include, for example, the mass flow rate and/or the volume flow rate and/or the feed speed of the plastic waste mixture stream. The range of variation of the 2D fraction or the 3D fraction of the plastic waste mixture stream can basically range between 0% and 100%. In normal operation, the range may be particularly in the range of 20%-80% or even 30%-70%.

Further, it may be provided that the separation of the portion of 2D material and the portion of 3D material from each other is performed after separating the plastic waste mixture stream into two fractions.

In addition, separating the plastic waste mixture stream into two fractions may be performed after washing and/or after shredding the plastic waste mixture stream. Shredding of the waste plastic mixture stream may be performed in a wet mill. This may be provided for simultaneous use as a washing and cutting mill, particularly of contaminated input material. Water may be used as the cleaning fluid. The cleaning fluid may be supplied to the grinding chamber of the mill during the shredding process. The motion of rubbing the material against each other while simultaneously shredding it provides a highly efficient washing process. A gravity assisting flow can be generated in the mill, for example by a feed pump. This makes it possible to achieve blockage-free conveying without stalling.

It is conceivable that the washing of the plastic waste mixture stream takes place before the shredding of the plastic waste mixture stream. The fact that the washing takes place before the shredding and the shredding in a wet mill also includes an additional cleaning process of the plastic waste mixture can significantly increase the quality and yield of the subsequent process steps for separation of the plastic types by type and for color separation and contribute to minimizing losses. It can also be provided that a further washing process of the plastic waste mixture stream takes place after the shredding of the plastic waste mixture stream.

Furthermore, it can be provided that prior to separating the portion of 2D material and the portion of 3D material from each other, dewatering of the plastic waste mixture stream takes place. The dewatering can comprise mechanical and/or thermal dewatering.

The density-based separation of the plastic waste mixture stream can be repeated several times to enrich a desired material fraction. It may therefore be envisaged that the plastic mixture stream passes through several hydrocyclones in succession. The concentration of the ground material is greater in the outlet for particles with higher specific gravity of the hydrocyclone than in the outlet for particles with lower specific gravity. Therefore, the density of the second stage of the hydrocyclone can be set incrementally smaller or larger than the density of the first stage. The hydrocyclone has an upper, cylindrical segment with a tangential inlet, and further has a lower, conical segment with an underflow or apex nozzle. Further, the hydrocyclone may have a vortex finder or overflow nozzle, in the form of a dip tube which projects axially, from above, into the interior of the cyclone and terminates below the tangential inlet. Due to the tangential inlet into the cylindrical segment, the liquid is forced into a circular path and flows downward in a downward vortex. The taper in the conical segment causes volume to be displaced inward and to build up in the lower portion of the cone, resulting in the formation of an internal upward vortex that escapes through the vortex finder or overflow orifice. The objective is to separate the specifically heavier fraction (e.g., solids) on the wall of the cyclone and thus discharge it through the underflow, while the specifically lighter fraction escapes through the overflow. The hydrocyclone may have a vertical flow directed downward in the outer region (primary vortex) and upward in the inner region (secondary vortex). The particles accumulating in these flows are thus fed to either the upper or the lower flow opening.

It may be provided that the plastic waste mixture stream is fed to a centrifugal separator, in particular a hydrocyclone, for separation into two fractions. Hydrocyclones can be used to separate plastics according to their density.

It may further be provided that the predeterminable density for separating the plastic waste mixture stream is adjustable between 1 and 1.05 kg/dm3.

It may further be provided that the separation into two fractions comprises the enrichment of a light fraction in at least one first hydrocyclone and the enrichment of a heavy fraction in at least one second hydrocyclone. The hydrocyclones may be connected in series. For example, it may be provided that a first hydrocyclone makes a first separation cut into a light fraction and a heavy fraction, and that a further light fraction hydrocyclone receiving the light fraction and further enriching it is provided and/or a further heavy fraction hydrocyclone receiving the heavy fraction and further enriching it is provided. The heavy fraction hydrocyclone may be a flat-bottom hydrocyclone.

In particular, it may be provided that the 3D portion comprises voluminous plastic waste such as hollow bodies and the 2D portion comprises flat plastic waste such as films.

It is conceivable that washing is carried out by means of water, and wherein water is used as the cleaning medium when shredding the plastic waste mixture stream, the water being free of cleaning agents and/or flocculants in each case.

It can be provided that the washing and further washing of the plastic waste mixture stream takes place in each case in a friction washer. Due to its inclined orientation, the plastic waste mixture or the ground material in the friction washer is transported by a screw shaft of the friction separator from below to an outlet located above, with the washing process taking place during the transport from below to above. The fines, together with water and, for example, softened paper, can be spun outward through a fine screen enclosing the screw shaft and can be discharged through an outlet spout. Additional water can be added directly through an inlet opening if required. Provision may be made to constantly inject fresh water or clean circulating water to prevent clogging of the screen holes. In addition, constant mechanical cleaning of the screen surface can be carried out.

It may be envisaged that the separation of the proportion of 2D material and the proportion of 3D material is carried out by means of wind sifting. Individual particles can be separated on the basis of their ratio of inertia and/or gravity to flow resistance in an air stream. Finer, in particular flat, particles follow the flow, coarse ones the mass force. In the wind sifter, light fractions such as films or 2D can be separated from other heavy fractions such as hard plastics or hollow plastics or 3D. It can also be provided that more than two fractions are separated from each other. The wind sifter can be designed as a zigzag wind sifter. In this case, the washed and shredded stream of plastics containing 2D and 3D material is fed via an airtight feed device to a zigzag-shaped wind sifter channel. In this channel, light material is separated from heavy material by a multiple cross-flow sifting process. The air required for separation flows through the wind sifter channel from bottom to top. The light particles are entrained by the air stream. The heavy particles fall downwards against the air flow and are discharged at the sifter foot.

Furthermore, it may be provided that the plastic recycling method comprises the following steps prior to washing the plastic waste mixture stream: pre-crushing the plastic waste mixture stream; separating heavy material and impurities from the pre-crushed plastic waste mixture stream. Alternatively, washing can also take place prior to pre-crushing.

The pre-crushing, in particular shredding, of the plastic waste mixture stream can take place in the dry state of the plastic waste mixture stream. It can be provided that the shredder has a magnetic separator for ferrous materials and/or a non-ferrous separator for other metals and that corresponding materials are already separated in the course of the shredding or pre-crushing. It can be provided that the shredder has a safety clutch by means of which the shredder can be stopped immediately if larger metal parts are present in the plastic waste mixture stream.

It is also conceivable that the heavy material is separated by means of a heavy material trap, whereby the heavy material trap has a floating-sink separation via which the heavy material is separated. In the heavy material trap, the heavy material or impurities can sink due to their higher density within the heavy material trap and thus be present as sinking material. The plastics with a lower density can be discharged from the heavy-lift trap together with the liquid as a suspension and fed for further processing. The plastics contained in the suspension can be, for example, polyethylene (PE) and/or polypropylene (PP) and/or polyethylene terephthalate (PET).

Furthermore, separation of biogenic fractions can take place prior to separation of the heavy material.

In addition, separation of metal-containing materials can take place before the heavy material is separated. The mixed plastic material can be freed from metal parts by a magnet and a non-ferrous separator. The metals can then be returned to the
be recycled.

In addition, pre-crushing of the plastic waste mixture stream can occur prior to shredding, and shredding can produce finer shreds than pre-crushing.

The process may further comprise a closed process water circuit without continuous or regular fresh water supply. Thereby, washing, further washing and shredding of the plastic waste mixture stream may be integrated into the process water circuit.

In contrast to known processes, the present invention can provide for NIR sorting for plastic type separation and/or VIS sorting for color separation at the end of the process. The advantage of this is that only washed regrind mixtures pass through the NIR separation stages as monocharges. This process enables highly efficient separation of plastics according to their grade. The otherwise always existing danger of cross-mixing thus no longer exists. The plastic type separation can include a separation between polypropylene and HD polyethylene. Both fractions can each be subjected to color sorting. Furthermore, both fractions can be sorted according to light, dark and/or colored.

Further areas of applicability will become apparent from the description provided herein. The description and specific examples in this summary are intended for purposes of illustration only and are not intended to limit the scope of the present disclosure.

DRAWINGS

The drawing described herein is for illustrative purposes only of selected embodiments and not all possible implementations, and are not intended to limit the scope of the present disclosure.

Figure 2:
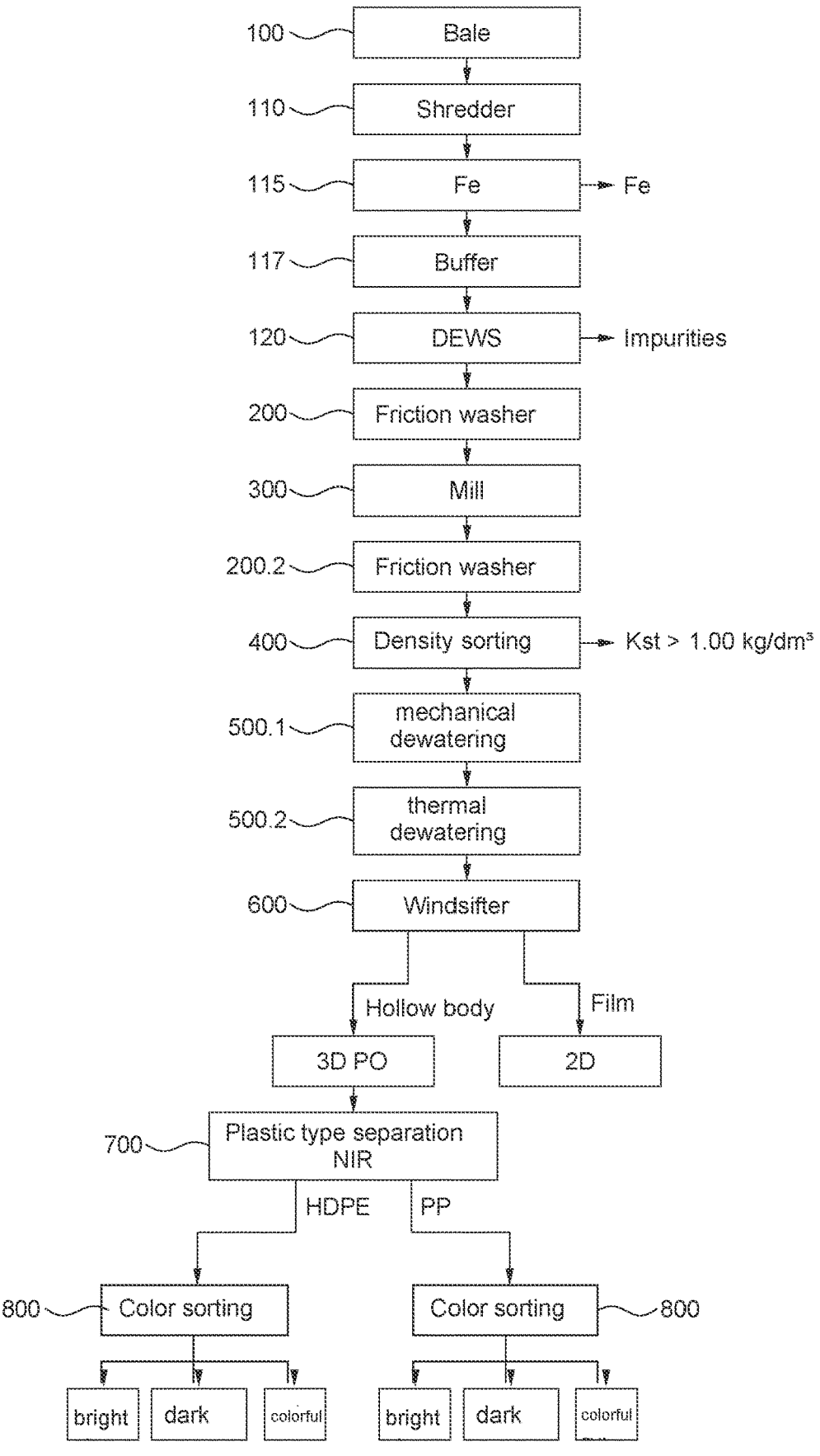
Figure 3:
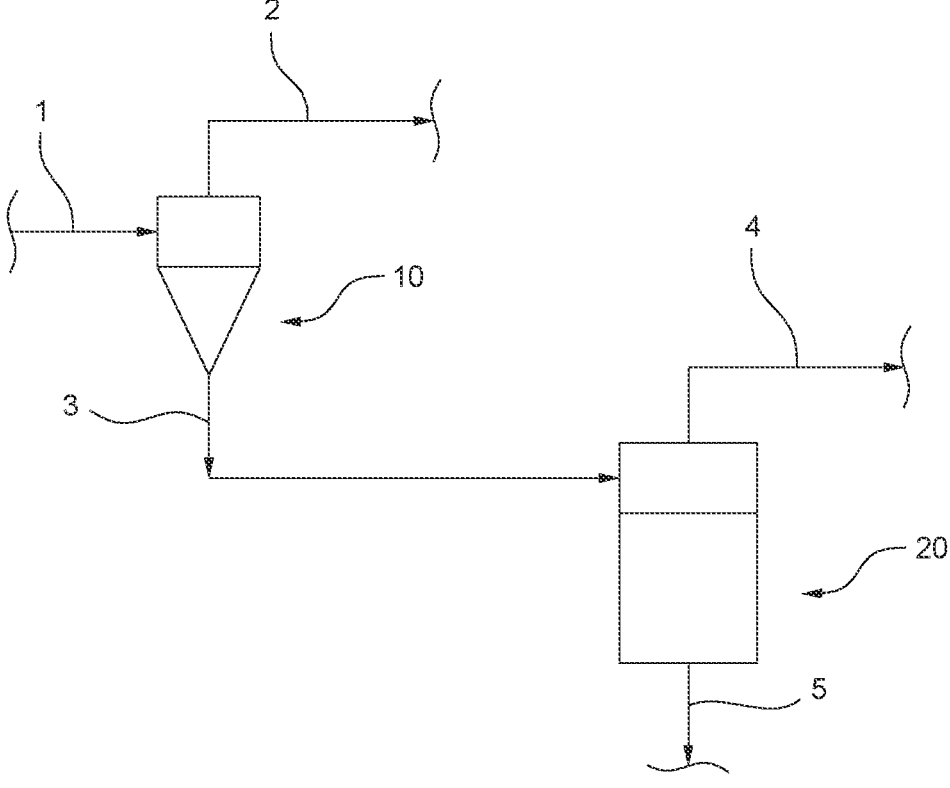

Further details of the invention are explained with reference to the figures below. Thereby shows:

FIG. 1 A flowchart of a first embodiment of the plastic recycling method according to the invention;

FIG. 2 A flow chart of a second embodiment of the plastic recycling method according to the invention;

FIG. 3 An illustration of an exemplary interconnection of two hydrocyclones of different configurations.

DETAILED DESCRIPTION

Example embodiments will now be described more fully with reference to the accompanying drawing.

In the plastic recycling method for processing plastic waste shown in FIG. 1, a plastic waste mixture stream is first provided in bales 100. This has a variable proportion of 2D material on the one hand and a variable proportion of 3D material on the other. Furthermore, the plastic waste mixture stream has an inhomogeneous density distribution. The bale-shaped plastic waste mixture is fed to a shredder and pre-crushed 110 therein, in which, in addition to the pre-crushing of the plastic outside, a separation 115 of metal-containing materials from the plastic waste mixture stream takes place. Subsequently, the pre-crushed material is temporarily buffered 117. A pre-washing screw is then used for washing and soaking the plastic waste mixture stream and for separating 20 sinking impurities such as stones, sand or glass. In this process, the plastic waste mixture is fed into a prewash tank at a lower end of the prewash screw and forced under water by paddle rollers. The plastic waste mixture is then conveyed to the top by one or more screw conveyors. During transport, the material is in strong motion, so contaminants such as stones, sand, glass, and metals can easily sink. In addition, the adhesions to the plastic are soaked so that they can be detached more easily. Depending on the type of contamination, different discharge systems can be used. Simple, small contaminations such as stones or glass can be discharged via a time-controlled slide gate system. For larger or long contaminants, such as wire, or larger amounts of contamination, scraper chain conveyors or screws can be used for contamination discharge. The plastic waste mixture is then fed to a first friction washer for washing 200. Due to its inclined orientation, the plastic waste mixture or the regrind in the friction washer is transported by a screw shaft of the friction separator from below to an outlet at the top, with the washing process taking place during the transport from bottom to top. During this process, the fines, together with water and, for example, also softened paper, can be spun outward through a fine screen enclosing the screw shaft and can drain off through an outlet spout. Subsequently, the plastic waste mixture stream is shredded to a target particle size of the material to be ground 300 in a wet mill, in which the plastic waste mixture stream is simultaneously washed and shredded with the addition of water. The water is supplied to the grinding chamber of the mill during the shredding process. Then, the plastic waste mixture is fed to a second friction washer for rewashing 200.2. Subsequently, a density-based separation 400 of the plastic waste mixture stream into two fractions takes place by means of a hydrocyclone. In the embodiment shown, the separation is performed as a function of a density separation cut of 1 kg/dm³. Here, the heavy fraction with a density of >1 kg/dm³ is discharged at the bottom of the hydrocyclone and the light fraction with a density of <1 kg/dm³ is discharged at the top of the hydrocyclone. The heavy fraction is thereby discharged from the process, while the light fraction is subsequently dewatered first mechanically 500.1 and then thermally 500.2. The light fraction is then separated in a wind sifter into a fraction of 2D material and a fraction of 3D material 600, separating the regrind based on its ratio of inertia and/or gravity to flow resistance in a gas stream. The finer particles of ground material follow the flow, the coarser ones the mass force. Thus, in the wind sifter, the light fraction comprising films or 2D is separated from the heavy fraction comprising hard plastics or hollow plastics or 3D.

The embodiment of the process according to the invention shown in FIG. 2 has two differences compared to the process shown in FIG. 1. Firstly, in the embodiment according to FIG. 2, the separation is carried out as a function of a density separation cut of 1.05 kg/dm³. Here, the heavy fraction with a density of >1.05 kg/dm³ is discharged at the bottom of the hydrocyclone and the light fraction with a density of <1.05 kg/dm³ is discharged at the top of the hydrocyclone. On the other hand, after the separation 600 in the wind sifter, a plastic type separation 700 into the plastic types HDPE and PP is performed by means of near infrared (NIR) for the fraction of 3D hollow polyolefins. Both plastic type streams are then subjected separately to color sorting 800, in which a light, a dark and a colored fraction are separated from each other, for example by means of visible light (VIS) spectroscopy.

FIG. 3 shows an interconnection example of two hydrocyclones 10, 20 for recovering further polymers in the course of density-based separation 400 of the plastic waste mixture stream 1. The plastic waste mixture stream 1 is fed to a first hydrocyclone 10 and comprises, for example, PE, PP, PS, PET, PP-T, ABS and other components. In the example shown, the first hydrocyclone 10 is a conical hydrocyclone and divides the plastic waste mixture stream 1 into a first light fraction 2 and a first heavy fraction 3. The first hydrocyclone 10 separates the first light fraction 2 and the first heavy fraction 3 at a density cut of 1 kg/dm³. The first light fraction 2 thus includes, for example, PE and PP. The first heavy fraction 3 accordingly includes the remainder of the plastic waste mixture stream 1, namely PS, PET, PP-T, ABS as well as the other components. The first light fraction 2 is then fed to the further steps of the process, while the first heavy fraction 3 is fed to a second hydrocyclone 20, which is designed as a flat-bottom hydrocyclone. In this, a density separation cut is made at up to 1.05 kg/dm³, so that a second light fraction 4 is separated from a second heavy fraction 5 in the second hydrocyclone 20. The second light fraction 4 comprises PS, PP-T and ABS, while the second heavy fraction 5 comprises PET and the other constituents. After passing through the hydrocyclones, all fractions 2-5 are fed separately to the further process steps.

The features of the invention disclosed in the foregoing description, in the drawings as well as in the claims may be essential to the realization of the invention both individually and in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A plastic recycling method for processing plastic waste, comprising:

Providing a plastic waste mixture stream having a variable proportion of 2D material and a variable proportion of 3D material in an inhomogeneous density distribution, wherein the 3D portion comprises voluminous plastic waste and the 2D portion comprises sheet plastic waste or film plastic waste, the proportions varying over time;

Joint washing of both portions of the plastic waste mixture stream;

Joint shredding of both portions of the plastic waste mixture stream while supplying a cleaning fluid; and thereafter:

Density-based separation of the plastic waste mixture stream into at least two fractions, wherein the separation is performed in response to a predeterminable density separation cut;

for at least one of the density separated fractions, separating the fraction of 2D material and the fraction of 3D material from each other.

2. The plastic recycling method of claim 1, further comprising:

detecting the proportion of 2D material and/or the proportion of 3D material in the plastic waste mixture stream;

regulating a feed parameter of the plastic waste mixture stream depending on the detected proportion of 2D and/or 3D material.

3. The plastic recycling method according to claim 1, wherein separating the portion of 2D material and the portion of 3D material from each other is performed after separating the plastic waste mixture stream into two fractions.

4. The plastic recycling method according to claim 1, wherein separating the waste plastic mixture stream into two fractions is performed after shredding the waste plastic mixture stream.

5. The plastic recycling method according to claim 1, wherein the washing of the plastic waste mixture stream occurs prior to the shredding of the plastic waste mixture stream.

6. The plastic recycling method according to claim 1, wherein a further joint washing operation of both portions of the plastic waste mixture stream occurs after the plastic waste mixture stream is shredded.

7. The plastic recycling method according to claim 6, wherein the washing and the further washing of the plastic waste mixture stream are each performed in a friction washer.

8. The plastic recycling method according to claim 1, wherein prior to separating the portion of 2D material and the portion of 3D material from each other, dewatering of the plastic waste mixture stream is performed.

9. The plastic recycling method of claim 8, wherein the dewatering comprises mechanical and/or thermal dewatering.

10. The plastic recycling method according to claim 1, wherein the density-based separation of the plastic waste mixture stream is repeated a plurality of times to enrich a desired material fraction.

11. The plastic recycling method according to claim 1, wherein the plastic waste mixture stream is fed to a centrifugal separator, for separation into two fractions.

12. The plastic recycling method according to claim 1, wherein the predeterminable density cut for separating the plastic waste mixture stream is adjustable between 1 and 1.05 kg/dm$^3$.

13. The plastic recycling method of claim 11, wherein separating into two fractions comprises enriching a light fraction in at least a first hydrocyclone and enriching a heavy fraction in at least a second hydrocyclone.

14. The plastic recycling method of claim 1, wherein the 3D portion comprises hollow plastic waste.

15. The plastic recycling method according to claim 1, wherein the washing is carried out by means of water, and wherein water is used as cleaning medium in the shredding of the plastic waste mixture stream, the water being free of cleaning agents and/or flocculants.

16. The plastic recycling method according to claim 1, wherein the separation of the portion of 2D material and the portion of 3D material is performed by wind sifting.

17. The plastic recycling method according to claim 1, comprising the following steps prior to washing the plastic waste mixture stream:

Pre-crushing of the plastic waste mixture stream;

Separation of heavy material and impurities from the pre-crushed plastic waste mixture stream, wherein the heavy material has a higher density than the plastic waste mixture stream.

18. The plastic recycling method according to claim 17, wherein the pre-crushing of the plastic waste mixture stream takes place in the dry state of the plastic waste mixture stream.

19. The plastic recycling method of claim 17, wherein the separation of the heavy material is performed by means of a heavy material trap, wherein the heavy material trap comprises a float-sink separation over which the heavy material is separated.

20. The plastic recycling method of claim 17, wherein separating the heavy material is further preceded by separating biogenic fractions.

21. The plastic recycling method of claim 17, wherein separating the heavy material is further preceded by separating metal-containing materials.

22. The plastic recycling method of claim 17, wherein the pre-crushing of the plastic waste mixture stream occurs prior to the shredding, and wherein the shredding produces finer shreds than the pre-crushing.

23. The plastics recycling process according to claim 1, further comprising a closed process water loop without continuous or regular fresh water supply.

\* \* \* \* \*